(12) United States Patent
Attanasio et al.

(10) Patent No.: US 7,373,072 B2
(45) Date of Patent: May 13, 2008

(54) FEEDTHROUGH FIBER STRAIN RELIEF

(75) Inventors: Daniel V. Attanasio, Clinton, CT (US);
George J. Talmadge, Clinton, CT (US); John J. Grunbeck, Northford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 150 days.

(21) Appl. No.: 11/012,501

(22) Filed: Dec. 15, 2004

(65) Prior Publication Data

US 2005/0135771 A1 Jun. 23, 2005

Related U.S. Application Data

(60) Provisional application No. 60/529,983, filed on Dec. 15, 2003.

(51) Int. Cl.
*G02B 6/00* (2006.01)
(52) U.S. Cl. ..................................... 385/138
(58) Field of Classification Search ............... None
See application file for complete search history.

(56) References Cited

U.S. PATENT DOCUMENTS

| | | | | |
|---|---|---|---|---|
| 4,709,980 A | * | 12/1987 | Coll et al. ................. | 385/134 |
| 5,131,067 A | | 7/1992 | Cachot et al. | |
| 5,210,815 A | * | 5/1993 | Alexander et al. .......... | 385/138 |
| 5,399,941 A | | 3/1995 | Grothaus et al. | |
| 5,657,412 A | | 8/1997 | Caudrelier | |
| 5,740,299 A | | 4/1998 | Llewellyn et al. | |
| 5,758,004 A | * | 5/1998 | Alarcon et al. ............. | 385/135 |
| 5,870,519 A | | 2/1999 | Jenkins et al. | |
| 6,409,179 B1 | * | 6/2002 | Daoud ........................ | 277/602 |
| 6,526,212 B1 | | 2/2003 | Mishriky et al. | |
| 2003/0048996 A1 | | 3/2003 | Lowe et al. | |

FOREIGN PATENT DOCUMENTS

| | | |
|---|---|---|
| EP | 0 533 112 | 3/1993 |
| GB | 2 275 786 | 9/1994 |
| GB | 2 277 812 | 11/1994 |
| WO | WO 03/058314 | 7/2003 |

OTHER PUBLICATIONS

U.K. Search Report, Application No. GB0427461.9, dated Feb. 25, 2005.
Canadian Office Action, Application No. 2490225, dated Oct. 17, 2006.

* cited by examiner

*Primary Examiner*—Sung Pak
*Assistant Examiner*—Hoang Tran
(74) *Attorney, Agent, or Firm*—Patterson & Sheridan, L.L.P.

(57) ABSTRACT

Method and apparatus for feeding on optical waveguide through a partition device, such as a wellhead outlet are disclosed. For some embodiments, the wellhead outlet includes a first chamber having a first port, a second chamber having a second port connected by a path to the first port for feeding an optical waveguide through to the first chamber, and a strain relief member coupled with the first chamber to limit motion of the optical waveguide at or near the first port. The strain relief member can be a rigid curved tube coupled to the first port and/or a fiber management member providing one or more fiber retention pathways.

15 Claims, 4 Drawing Sheets

FEEDTHROUGH FIBER STRAIN RELIEF

CROSS-REFERENCE TO RELATED APPLICATIONS

This application claims benefit of U.S. provisional patent application Ser. No. 60/529,983, filed Dec. 15, 2003, which is herein incorporated by reference.

BACKGROUND OF THE INVENTION

1. Field of the Invention

Embodiments of the invention relate to devices having feedthroughs for optical waveguides, and more particularly, to hermetically sealed wellhead outlets with feedthroughs that are suitable for use in high pressure, high temperature, and/or other harsh environments.

2. Background Art

In many industries and applications, there exists a need to have small diameter wires or optical waveguides penetrate a partition such as a wall, bulkhead, or wellhead outlet, wherein a high fluid or gas differential pressure can exist across a feedtrough device in the partition. Furthermore, one or both sides of the feedthrough device may be subjected to high temperatures and other harsh environmental conditions, such as corrosive or volatile gas, fluids and other materials. For example, optical sensors, particularly sensors for use in bulkheads or wellhead outlets, oil and gas exploration and production, can require use of a feedthrough device that can seal an optical waveguide at pressures of 20,000 psi and above, and temperatures of 150° C. to 250° C. The wellhead outlets can include a feedthrough where an optical waveguide is concentrically located within a cavity in a housing, and the resulting annular space is filled with a suitable sealant. U.S. Pat. No. 6,526,212, issued Feb. 25, 2003, which is incorporated herein by reference in its entirety, describes in detail an exemplary feedthrough for installation within a bulkhead.

There exist several challenges associated with constructing a feedthrough device and fiber management system for use, for example, in a wellhead outlet. One of these challenges relates to damage and breakage of the fiber at a point where the fiber enters and exits the feedthrough device. The small size of the fiber and the brittle nature of glass materials of the fiber generally make any stress points along the fiber particularly susceptible to damage. For example, damage to the fiber at a stress point where the fiber exits the feedthrough into a low pressure chamber of the wellhead outlet can occur due to a significant stress concentration at that location. Accordingly, movement of the fiber at this stress point as can occur during handling of the wellhead outlet potentially leads to damage of the fiber. Further, the fact that the fiber is rigidly held on one side of the stress point and is free on the other side of the stress point within the low pressure chamber makes the fiber susceptible to damage at the stress point due to micro-bending.

While it is typically desirable to have a length of the fiber extending from the feedthrough for purposes such as splicing, any excess fiber extending from the feedthrough presents storage issues within the wellhead outlet. For example, excess fiber disposed within the low pressure chamber can be disorderly such that the likelihood of damage to the fiber during handling of the wellhead outlet is high, particularly at the stress point discussed above. The disordered arrangement of the fiber within the low pressure chamber permits micro-bends along the length of the fiber extending from the feedthrough and can enable the fiber to become pinched during final assembly of the wellhead outlet such as when a cap is inserted on the low pressure chamber.

Therefore, embodiments of the invention provide optical waveguide feedthrough assemblies and fiber management systems, and methods of making such assemblies, which overcome one or more of the above-described drawbacks and disadvantages of the prior art.

SUMMARY OF THE INVENTION

Embodiments of the invention generally relate to method and apparatus for feeding on optical waveguide through a partition device, such as a bulkhead of a wellhead outlet. For some embodiments, the wellhead outlet includes a first chamber having a first port, a second chamber having a second port connected by a path to the first port for feeding an optical waveguide through to the first chamber, and a strain relief member coupled with the first chamber to limit motion of the optical waveguide at or near the first port. The strain relief member can be a rigid curved tube coupled to the first port and/or a fiber management member providing one or more fiber retention pathways.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to a mechanism for feeding an optical waveguide through a partition of a device such as that of a wellhead outlet that includes two separate chambers. A passage between the two chambers defines ports within each chamber for feeding the optical waveguide between the two chambers. U.S. Pat. No. 6,526,212, issued Feb. 25, 2003, which is incorporated herein by reference in its entirety, describes an exemplary feedthrough that can be used within a bulkhead of a wellhead outlet according to embodiments of the invention described below. Embodiments will be described with reference to wellhead outlets as a particular, but not limiting, application example in order to facilitate understanding. However, those skilled in the art will recognize that the strain relief mechanism and fiber management system described herein may be used to advantage in a wide variety of other applications, for example, where fiber is routed between two chambers using a rigid feedthrough.

Figure 1A:
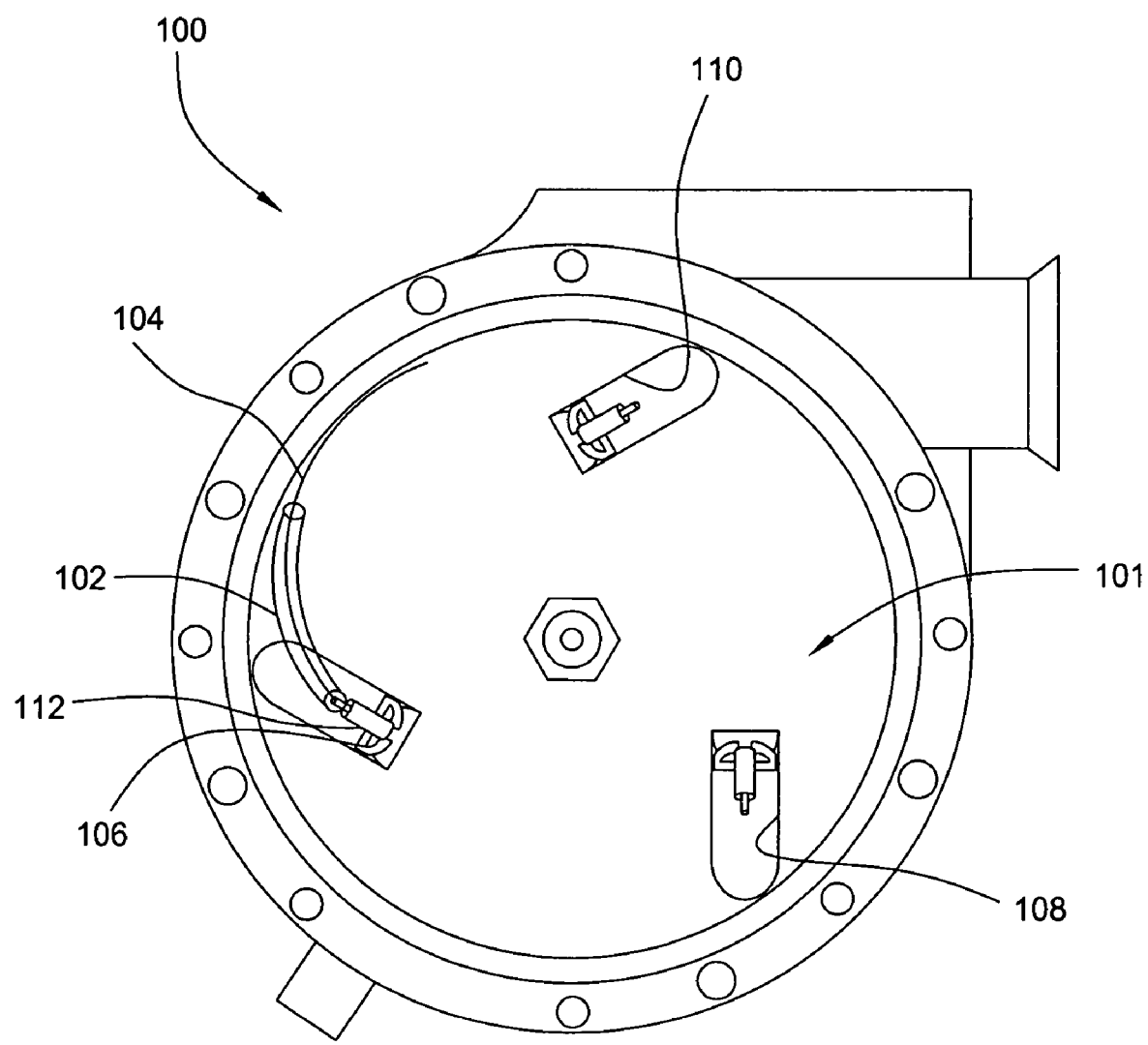
FIG. 1A is a view inside a first chamber of a wellhead outlet showing a rigid curved tube extending from one of three ports into the first chamber and having a fiber therein.

FIG. 1A shows an inside of a first chamber 101 of a wellhead outlet 100. A first chamber cap (not shown) covers the first chamber 101 upon further assembly of the wellhead outlet 100. The wellhead outlet 100 includes a rigid curved tube 102 (shown transparent) extending from a port 106 into the first chamber 101. The rigid curved tube 102 encompasses a fiber 104 therein and directs the fiber 104 from the port 106 while limiting motion of the fiber 104 at or near the port 106.

Figure 1B:
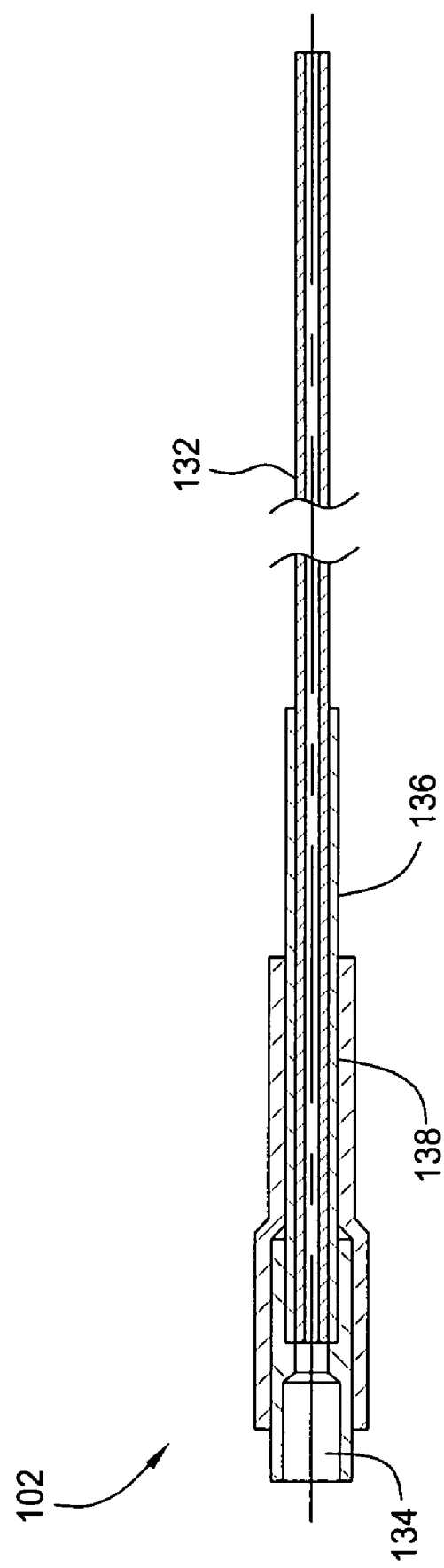
FIG. 1B is a cross sectional view of a strain relief member in accordance with the present invention.

The tube 102 may be made of any suitable rigid or semi-rigid material, capable of guiding the fiber 104 as it exits into a chamber. The tube 102 may also be affixed or coupled to the port by any suitable means (e.g., pressed on, threaded on, attached by adhesive etc.). For some embodiments, as illustrated in FIG. 1B, the tube 102 may be formed by attaching a flexible (e.g., Teflon) protective sheath 132 to a rigid metal tube 134 via heat-shrink elements 136 and 138. Small amounts of epoxy may be disposed between the heat-shrink elements 136 and the sheath 132 to prevent relative motion therebetween. In this configuration, the tube 102 may then be attached to the feedthrough 112 (shown in FIG. 1A) via a weld.

While the wellhead outlet 100 shown has two additional ports 108, 110 spaced from the port 106 having the fiber 104 fed through, any of the devices disclosed herein can provide a single port or any number of ports for feeding the fiber through the device. In general, a path through the wellhead outlet 100 couples the ports 106, 108, 110 to respective ports of a second chamber (see, FIG. 3). For some embodiments, the first chamber 101 defines an area of low pressure relative to an area of high pressure defined by the second chamber. Those skilled in the art will recognize that, while not shown, for some embodiments, the strain relief member and techniques described herein may also be applied to a waveguide portion extending into the second (high pressure) chamber. Furthermore, the fiber 104 can be sealed within the port 106 or the path by a feedthrough 112 such that the wellhead outlet 100 separates these pressures.

Like the port 106, the two additional ports 108, 110 can include their own rigid curved tubes and fibers after further assembly of the wellhead outlet 100, which is not shown. For some embodiments, the fiber 104 can be a single waveguide or multiple waveguides. Accordingly, each of the ports 106, 108, 110 enables feeding one or more optical waveguides through the wellhead outlet 100 to the second chamber.

During assembly of the wellhead outlet 100, the tube 102 threads onto the fiber 104 and is positioned proximate the port 106. If the feedthrough 112 is present, an end of the tube 102 can affix to an end of the feedthrough 112, such as by using a curable adhesive. For other embodiments, the tube 102 affixes directly to the port 106 or an adjacent portion of the first chamber 101.

Rigidity (or semi-rigidity) of the tube 102 substantially eliminates movement of the fiber 104 at a stress point where the fiber 104 exits the port 106 or feedthrough 112. Additionally, the tube 102 guides the fiber 104 along a gradual bend out of the port 106 and along a perimeter of the wellhead outlet 100. Optionally, the tube 102 may further guide the fiber 104 into a pathway of a fiber management member, which is described below. Therefore, the tube 102 provides one example of a strain relief member since the tube 102 protects the fiber 104 at the stress point, thereby substantially eliminating the possibility of damage to the fiber 104 at the stress point during handling.

Figure 2:
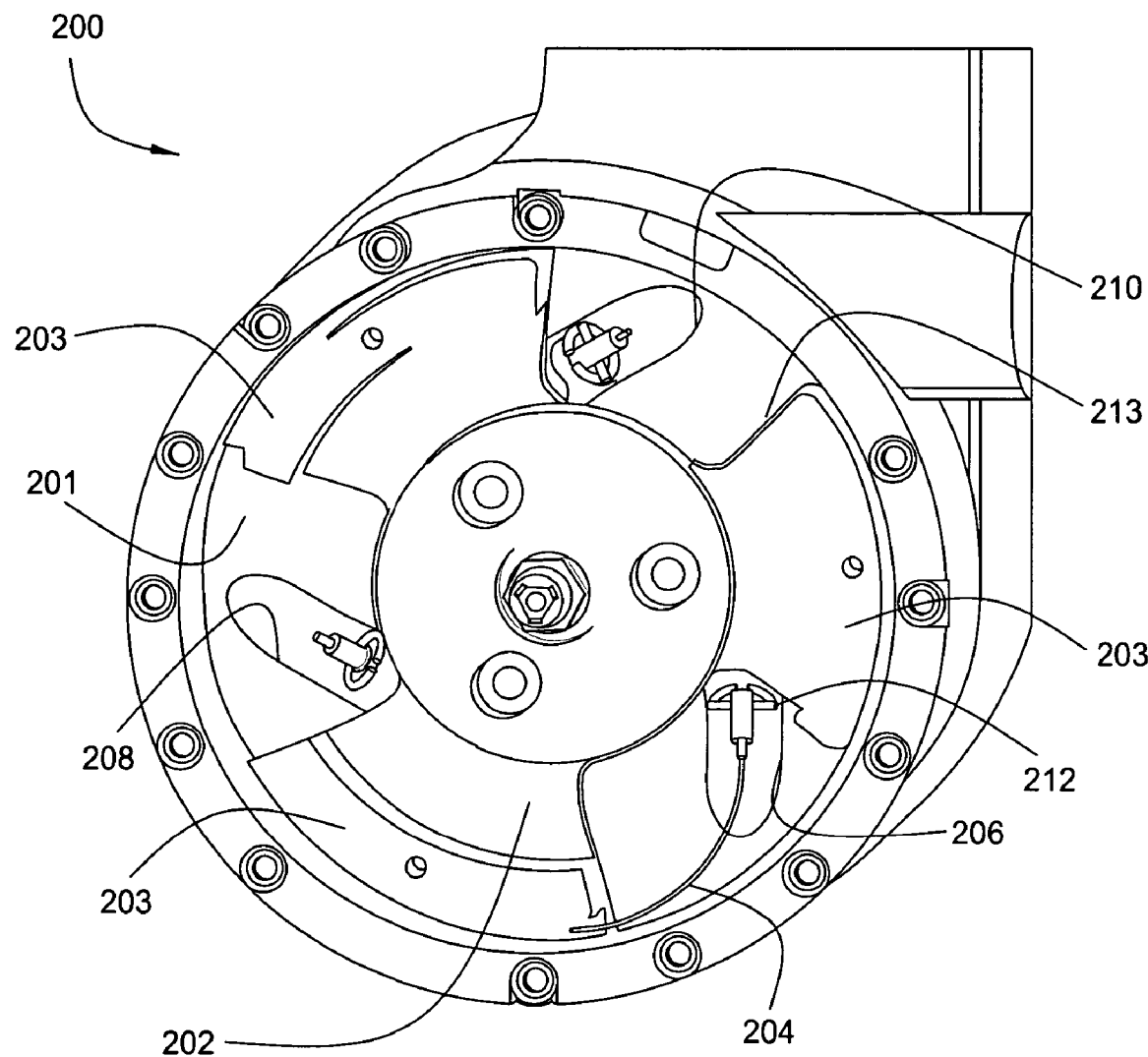
FIG. 2 is a view inside a first chamber of an alternative wellhead outlet illustrating a fiber extending from one of three ports into the first chamber and along a fiber retention pathway of a fiber management member.

FIG. 2 illustrates an inside of a first chamber 201 of an alternative wellhead outlet 200 having a fiber management member 202. The fiber management member 202 provides fiber retention pathways within the first chamber 201 for a length of a fiber 204 extending from a port 206 into the first chamber 201. For some embodiments, the fiber management member 202 defines a generally planar member disposable within the first chamber 201 and having an outer diameter portion extending toward the perimeter of the first chamber 201. Openings (e.g., cut outs 213) in the fiber management member 202 can allow the fiber 204 and any other fibers (not shown) extending from optional ports such as additional ports 208, 210 to pass from a feedthrough 212 to a face of the fiber management member 202 where the fiber 204 is to be organized.

Protrusions 203 on the outer diameter portions of the fiber management member 202 provide a surface for wrapping the fiber 204 around. Thus, the fiber 204 remains orderly, with minimum bending, and within an area between an inner diameter of the first chamber 201 and an outer diameter of the protrusions 203. In addition, the guiding of the fiber 204 from the port 206 by the fiber management member 202 prevents micro-bending and otherwise stabilizes the fiber 204 at the stress point where the fiber exits the feedthrough 212 or port 206. Therefore, the fiber management member 202 provides another example of a strain relief member.

While not shown, one skilled in the art will recognize that the strain relief member 102 described above with reference to FIGS. 1A and 1B may also be incorporated into the wellhead outlet 200 shown in FIG. 2. For some embodiments, such a strain relief member may guide an optical waveguide extending from a feedthrough 212 into the first chamber up to the outer diameter of the fiber management member 202.

Figure 3:
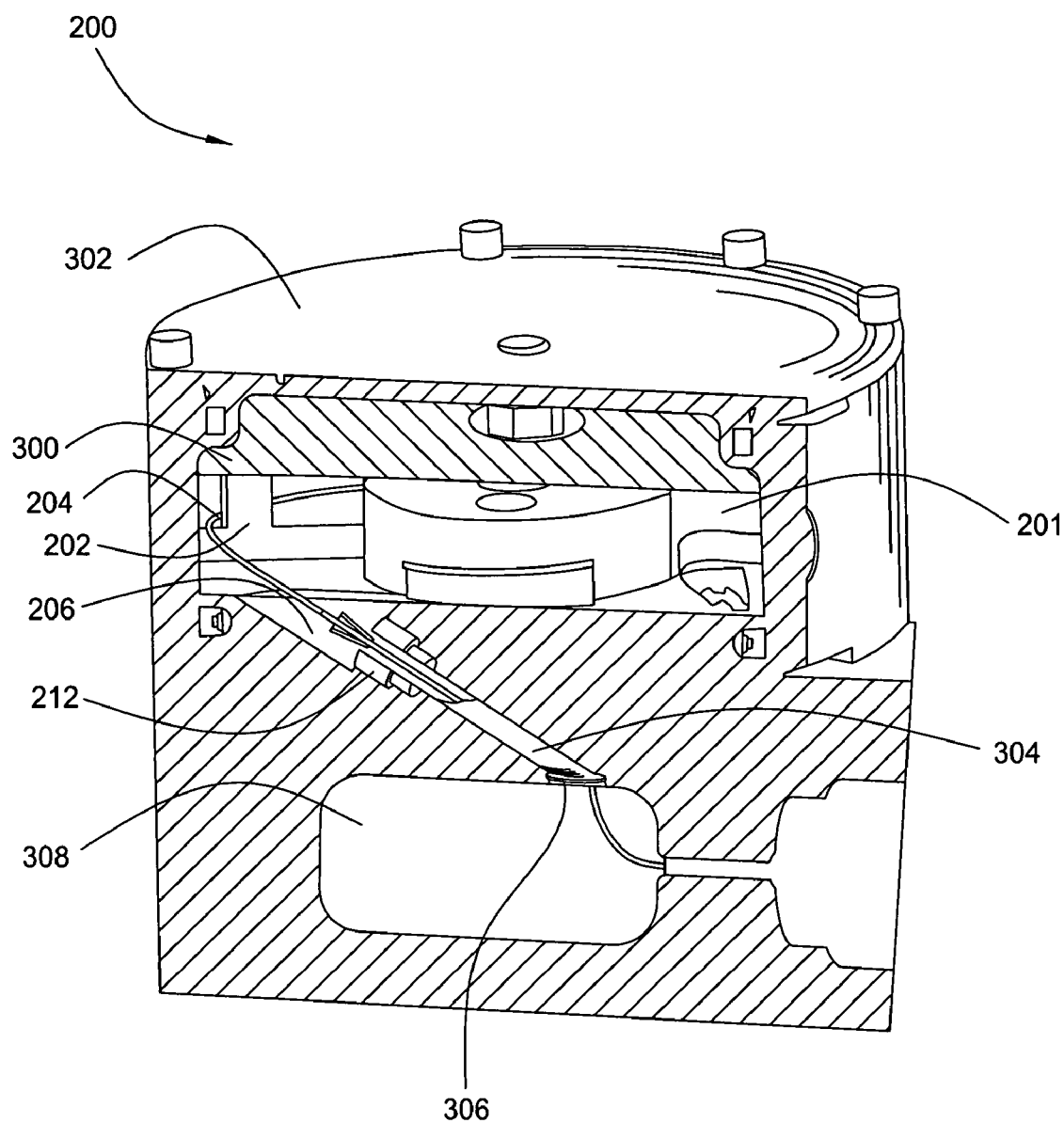
FIG. 3 is a cross-section view of the wellhead outlet in FIG. 2 showing an internal cover disposed between a cap of the first chamber and the fiber management member.

FIG. 3 shows a cross-section of the wellhead outlet 200 after assembly with an internal cover 300 disposed between a cap 302 of the first chamber 301 and the fiber management member 202. As referenced above with respect to the general structure of a wellhead outlet, FIG. 3 also illustrates a path 304 through the wellhead outlet 200 that connects the port 206 of the first chamber 201 with a port 306 of a second chamber 308. The cover 300 assists in fiber management within the first chamber 201 by further surrounding the fiber 204 wrapped on the fiber management member 202. Accordingly, the cover 300 prevents the possibility of the fiber 204 being pinched during insertion of the cap 302 onto the first chamber 201.

While the foregoing is directed to embodiments of the present invention, other and further embodiments of the invention may be devised without departing from the basic scope thereof, and the scope thereof is determined by the claims that follow.

The ivention claimed is:

1. A fiber management system, comprising:
   a partition having a first one or more ports;
   a first one or more feedthrough mechanisms disposed in the first one or more ports for feeding one or more optical waveguides into a first chamber through the first one or more ports, wherein the one or more optical waveguides each traverse the partition and are sealed within the first one or more ports via the first one or more feedthrough mechanisms; and
   a strain relief member positioned to guide a portion of the one or more optical waveguides extending from the first one or more feedthrough mechanisms into the first chamber, wherein the strain relief member comprises a fiber management member providing one or more fiber retention pathways and wherein the fiber management member includes protrusions for guiding the one or more optical waveguides along an outside diameter thereof.

2. The system of claim 1, wherein the strain relief member comprises a tube adapted to receive at least one optical waveguide and coupled with at least one of the first one or more ports.

3. The system of claim 2, wherein the strain relief member comprises a curved tube adapted to receive at least one optical waveguide and coupled with at least one of the first one or more ports.

4. The system of claim 3, wherein the strain relief member comprises a rigid curved tube adapted to receive at least one optical waveguide and coupled with at least one of the first one or more ports.

5. The system of claim 1 further comprising a cover disposed between the fiber management member and a cap of the first chamber.

6. The system of claim 1, wherein the first chamber is a low pressure chamber separated from a second chamber that is a high pressure chamber to prevent breach of high pressures into the low pressure chamber.

7. The system of claim 1, further comprising:
a second one or more feedthrough mechanisms disposed in a second one or more ports of the partition for feeding the one or more optical waveguides into a second chamber through the second one or more ports; and
a strain relief member positioned to guide a portion of the one or more optical waveguides extending from the second one or more feedthrough mechanisms into the second chamber.

8. A method of managing an optical waveguide, comprising:
providing a fiber management system including a strain relief member to guide a portion of the optical waveguide as it extends into a first chamber from a feedthrough mechanism disposed in a port of a partition;
feeding the optical waveguide through the port into the first chamber via the feedthrough mechanism to traverse the partition, wherein motion of the optical waveguide at or near the port is limited by the strain relief member;
sealing the optical waveguide within the port via the feedthrough mechanism; and
wrapping a length of the optical waveguide extending from the port onto a fiber management member.

9. The method of claim 8, wherein the strain relief member is a rigid and curved tube.

10. The method of claim 8, wherein feeding the optical waveguide includes passing the optical waveguide through a feedthrough and affixing the optical waveguide therein, thereby isolating a low pressure environment in the first chamber from a high pressure environment in a second chamber.

11. The method of claim 8, further comprising organizing a length of the optical waveguide extending into the first chamber on the fiber management member.

12. The method of claim 11, wherein organizing the length of optical waveguide includes wrapping the optical waveguide around protrusions formed on an outer diameter of the fiber management member.

13. The system of claim 1, wherein the partition forms part of a wellhead.

14. The system of claim 1, wherein the strain relief member is affixed to the first one or more feedthrough mechanisms.

15. The system of claim 1, wherein the strain relief member is affixed directly to the first one or more ports.

* * * * *